United States Patent
Nair et al.

(10) Patent No.: US 9,904,613 B2
(45) Date of Patent: Feb. 27, 2018

(54) METHOD FOR PERFORMANCE MONITORING USING A REDUNDANCY TRACKING REGISTER

(71) Applicant: International Business Machines Corporation, Armonk, NY (US)

(72) Inventors: Sooraj R. Nair, Bangalore (IN); Srinivas Purushotham, Vaddarpalya (IN); Madhavan Srinivasan, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 15/085,384

(22) Filed: Mar. 30, 2016

(65) Prior Publication Data

US 2017/0286251 A1 Oct. 5, 2017

(51) Int. Cl.
*G06F 11/00* (2006.01)
*G06F 11/34* (2006.01)
*G06F 11/30* (2006.01)

(52) U.S. Cl.
CPC ...... *G06F 11/3452* (2013.01); *G06F 11/3006* (2013.01); *G06F 11/3024* (2013.01); *G06F 11/3027* (2013.01); *G06F 11/3034* (2013.01); *G06F 11/3041* (2013.01); *G06F 11/3051* (2013.01)

(58) Field of Classification Search
USPC ....................................... 714/47.2
See application file for complete search history.

(56) References Cited

U.S. PATENT DOCUMENTS 6,230,282 B1 * 5/2001 Zhang ................. G06F 11/2048
714/13
6,347,362 B1 2/2002 Schoinas et al.
(Continued)

OTHER PUBLICATIONS

Inam et al., "Bandwidth Measurement using Performance Counters for Predictable Multicore Software," 2012 IEEE 17th Conference on Emerging Technologies and Factory Automation (ETFA), IEEE, 2012. 4 pgs.
(Continued)

*Primary Examiner* — Sarai Butler
(74) *Attorney, Agent, or Firm* — Cantor Colburn LLP

(57) ABSTRACT

Embodiments include a system for performance monitoring, the system includes a processor configured to perform a method. The method includes detecting, by a redundancy register, a change to a counter value corresponding to one of a plurality of hardware counters, wherein the redundancy register comprises a plurality of memory locations; storing, in each of the plurality of memory locations, a value indicating a change was detected for the counter value corresponding to the plurality of hardware counters, wherein each of the plurality of hardware counters map to one of the plurality of memory locations; performing read operation on a subset of the hardware counters, wherein members of the subset of the hardware counters are determined based upon the value indicating that the change was detected for the counter value corresponding to the plurality of hardware counters; and resetting the value stored in all the memory locations to a default value.

20 Claims, 4 Drawing Sheets

(56) References Cited

U.S. PATENT DOCUMENTS

| | | | |
|---|---|---|---|
| 7,957,323 B2* | 6/2011 | Uyehara | H04L 43/08 370/254 |
| 8,667,113 B2 | 3/2014 | Veerabhadrappa | |
| 2009/0063719 A1* | 3/2009 | Honjo | G06F 11/0727 710/8 |
| 2011/0276835 A1* | 11/2011 | Lee | G06F 8/66 714/38.1 |
| 2014/0379953 A1 | 12/2014 | Heyrman et al. | |
| 2016/0147586 A1* | 5/2016 | Mayer | G06F 11/0721 714/37 |

OTHER PUBLICATIONS

Mos, Adrian, et al, "COMPAS: Adaptive Performance Monitoring of Component-Based Systems," Proceedings of 2nd ICSE Workshop on Remote Analysis and Measurement of Software Systems, 2004. 5 pgs.

Nikolaev, Ruslan et al., "Perfctr-Xen: A Framework for Performance Counter Virtualization," ACM SIGPLAN Notices, v.46, n.7, pp. 15-25, ACM, 2011.

* cited by examiner

METHOD FOR PERFORMANCE MONITORING USING A REDUNDANCY TRACKING REGISTER

BACKGROUND

The present disclosure relates to performance monitoring, and more specifically, to methods and systems and computer program products for performance monitoring using a redundancy tracking register.

As electronic systems become more complicated, there is a greater need for monitoring the performance of the systems to ensure optimum operation and identify any defects or design problems. This concern is particularly important for integrated circuits such as processors and other state-of-the-art devices used in computer systems. A typical processor includes various execution units, registers, buffers, memories, and other functional units which are all formed by integrated circuitry. Hardware counters may be embedded within this circuitry to keep track of various events. Today's processors typically provide performance monitoring counters that count the time, cycles, or other types of events between a first event and a second event. As performance monitoring counters grow in number, it is important to focus on memory reads of relevant hardware counters each read cycle. 24×7 In-Memory-Accumulation (hereinafter, 24×7 IMA) is a methodology implemented in Power8 to utilize an embedded POWERPC core in the P8 chip to periodically read a performance monitoring unit (PMU) counter value in hardware and accumulate these counter values in a specific location in the system memory from where they can be readily accessed via a software tool. As multiple events occur or do not occur within the periodic read of a PMU counter value, it would be beneficial to read only those counter values that have changed between periodic reads.

SUMMARY

Embodiments include a computer system for performance monitoring, the computer system including detecting, by a redundancy register, a change to a counter value corresponding to one of a plurality of hardware counters, wherein the redundancy register comprises a plurality of memory locations; storing, in each of the plurality of memory locations, a value indicating that the change was detected for the counter value corresponding to the plurality of hardware counters, wherein each of the plurality of hardware counters map to one of the plurality of memory locations; performing a read operation on a subset of the plurality of hardware counters, by a memory, wherein members of the subset of the plurality of hardware counters are determined based upon the value indicating that the change was detected for the counter value corresponding to the plurality of hardware counters; and resetting the value stored in all the plurality of memory locations to a default value after performance of the read operation.

Embodiments also include a computer program product for performance monitoring, the computer program product including a non-transitory computer readable storage medium having computer readable program code embodied therewith. The computer readable program code including computer readable program code configured to perform a method. The method includes detecting, by a redundancy register, a change to a counter value corresponding to one of a plurality of hardware counters, wherein the redundancy register comprises a plurality of memory locations; storing, in each of the plurality of memory locations, a value indicating that the change was detected for the counter value corresponding to the plurality of hardware counters, wherein each of the plurality of hardware counters map to one of the plurality of memory locations; performing a read operation on a subset of the plurality of hardware counters, by a memory, wherein members of the subset of the plurality of hardware counters are determined based upon the value indicating that the change was detected for the counter value corresponding to the plurality of hardware counters; and resetting the value stored in all the plurality of memory locations to a default value after performance of the read operation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
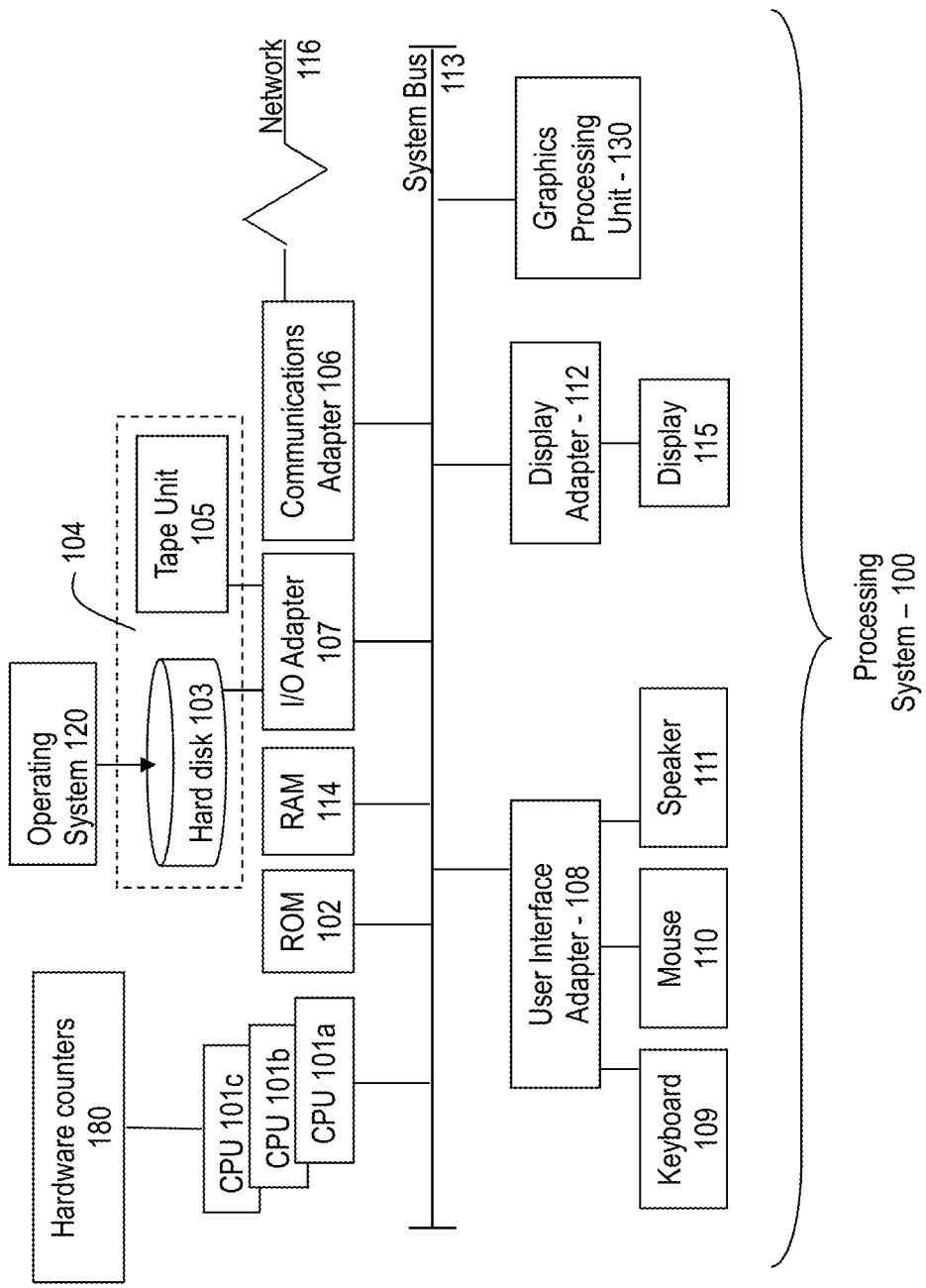
FIG. 1 illustrates a block diagram of a computer system for use in practicing the teachings herein.

In accordance with exemplary embodiments of the disclosure, methods, systems and computer program products for performance monitoring using a redundancy tracking register are provided. In exemplary embodiments, performance monitoring includes reading hardware counters which track various hardware events. A redundancy tracking register tracks changes to a hardware counter and stores a value indicating that a change has occurred. As a result, when a memory read operation is executed only hardware counters corresponding to the redundancy tracking register that shows a value indicating a change to the hardware counters will need to be read. Once the memory has read the hardware counters with changes according to the redundancy tracking register, the redundancy tracking register will have all its values reset to a default value.

Advantages of the present invention include the avoidance of any redundant reads in a memory and allow for only relevant data to be read. In certain systems, the memory reads from the counters once every 50 microseconds (μsec). The events within a system occur at varying frequency resulting in a portion of the total events occurring within this 50 μsec period which results in multiple unnecessary memory reads. By reducing the number of unnecessary or redundant memory reads, the system can save on both processing bandwidth and power consumption. For example, in 24×7 in-memory accumulation (IMA), the system may monitor hundreds of events periodically. Each and every event may be counted in a 64-bit counter (8 bytes wide) and if a memory read operation occurs every 64 µsec, then this would amount to 31 Kbytes per second. If the system were to monitor 650 events (i.e. in a Power8), this would result in close to 20 MB per second which would increase processing bandwidth consumption as well as power consumption.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. In one embodiment, each processor 101 may include one or more hardware counters 180. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Figure 2:
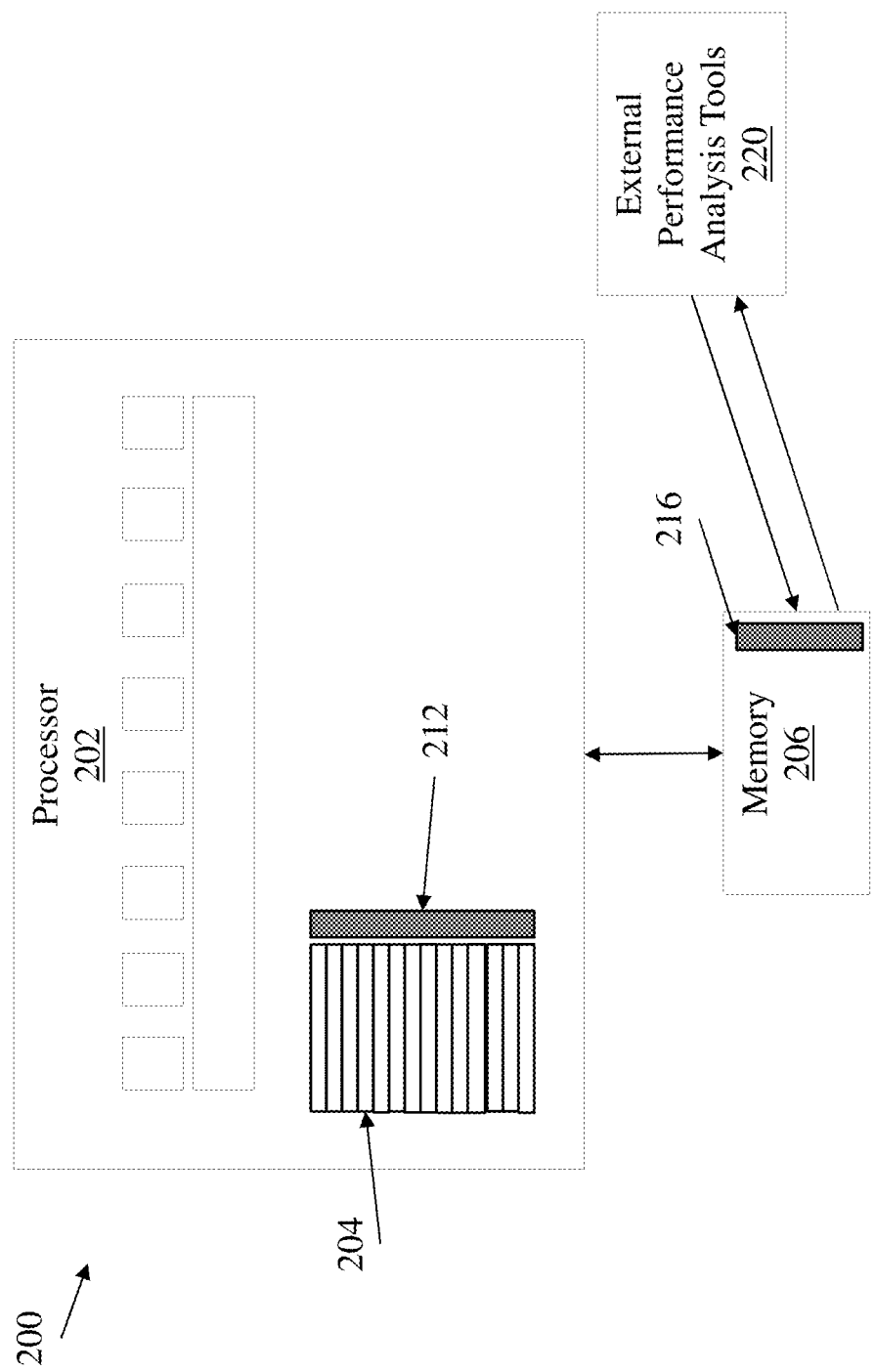
FIG. 2 illustrates a block diagram of a system for performance monitoring using a redundancy tracking register in accordance with an embodiment.

FIG. 2 is block diagram illustrating a system 200 according to an exemplary embodiment. In exemplary embodiments, the system 200 includes a processor 202, a plurality of hardware counters 204, a memory 206, a redundant tracking register 212, a redundancy tracking register history 216, and external performance analysis tools.

In an embodiment, the processor 202 may be any of the processing units 130 described in FIG. 1. The processor 202 is configured to periodically read the plurality of hardware counters 204. In an embodiment, the plurality of hardware counters 204 can be counters configured to monitor performance events in the system 200. The multiple hardware counters 204 are configured to store the counts of various hardware related events within the processor 202. Hardware related events include, but are not limited to, cycles, typical start and stop events, instruction fetches and instruction completions, load fetches and load completions, and cache misses and cache reloads.

In an embodiment, the system 200 includes a redundancy tracking register 212. The redundancy tracking register 212 is configured to track a hardware counter 204 event by storing a value, which may be a binary value i.e. 1 or 0, that is used to indicate when a hardware counter 204 has been incremented. The redundancy tracking register 212 can be one or more registers of varying size or memory locations. In an embodiment, each memory location of the redundancy tracking register 212 maps to one hardware counter, i.e., there is a 1:1 ratio between a memory location and hardware counter. In another embodiment, a memory location may map to multiple hardware counters and after a hardware event occurs, multiple binary values may be stored in the memory locations of the redundancy tracking register 212. For example, a memory location may track four hardware counters 204. If the first two hardware counters 204 are incremented and the last two hardware counters 204 are not incremented, a binary value of 1100 may be stored in the memory location.

The system 200 also includes a memory 206. The memory 206 is configured to read the hardware counter 204 values on a periodic basis. In exemplary embodiments, the memory 206 performs a read operation on the hardware counters 204 based upon the value within the redundancy tracking register 212. For example, the memory 206 could only read hardware counters 204 with a corresponding '1' value within the redundancy tracking register 212 associated with the hardware counter 204. Should the redundancy tracking register 212, contain a '0', the memory 206 will not read the corresponding hardware counter 204. In exemplary embodiments, after a read operation is performed on the hardware counters 204, the redundancy tracking register 212 will be reset so that all values within the register 212 will be set to a default value or to '0'. Each of the memory locations in the redundancy tracking register 212 correspond to one or more hardware counters 204 such that the incrementing of one hardware counter causes a change in the value stored in the memory location within the redundancy tracking register. For example, a hardware counter 204 may be configured to count cache misses. In between the periodic reads by the memory 206, one or more cache misses occur, the hardware counter 204 will increment these cache misses. The redundancy tracking register 212 will store a value, such as a binary value of '1', in the memory location corresponding to the hardware counter 204. The redundancy tracking register 212 will store only one value regardless of the number of times a hardware counter 204 is incremented. For example, the redundancy tracking register 212 would store a '1' in the memory location of the hardware counter 204 configured to count cache misses if the counter is incremented one or multiple times within the period of the periodic read operation by the memory 206. In an embodiment, a user may set the periodic rate.

Additionally, the memory 206 will store a copy of the redundancy tracking register history 216 in memory which can be read periodically by external performance analysis tools 220 to reduce the redundant bandwidth consumed between an external tool and memory 206. In embodiments, external performance analysis tools 220 can be utilized to evaluate the performance of a processor.

Figure 3:
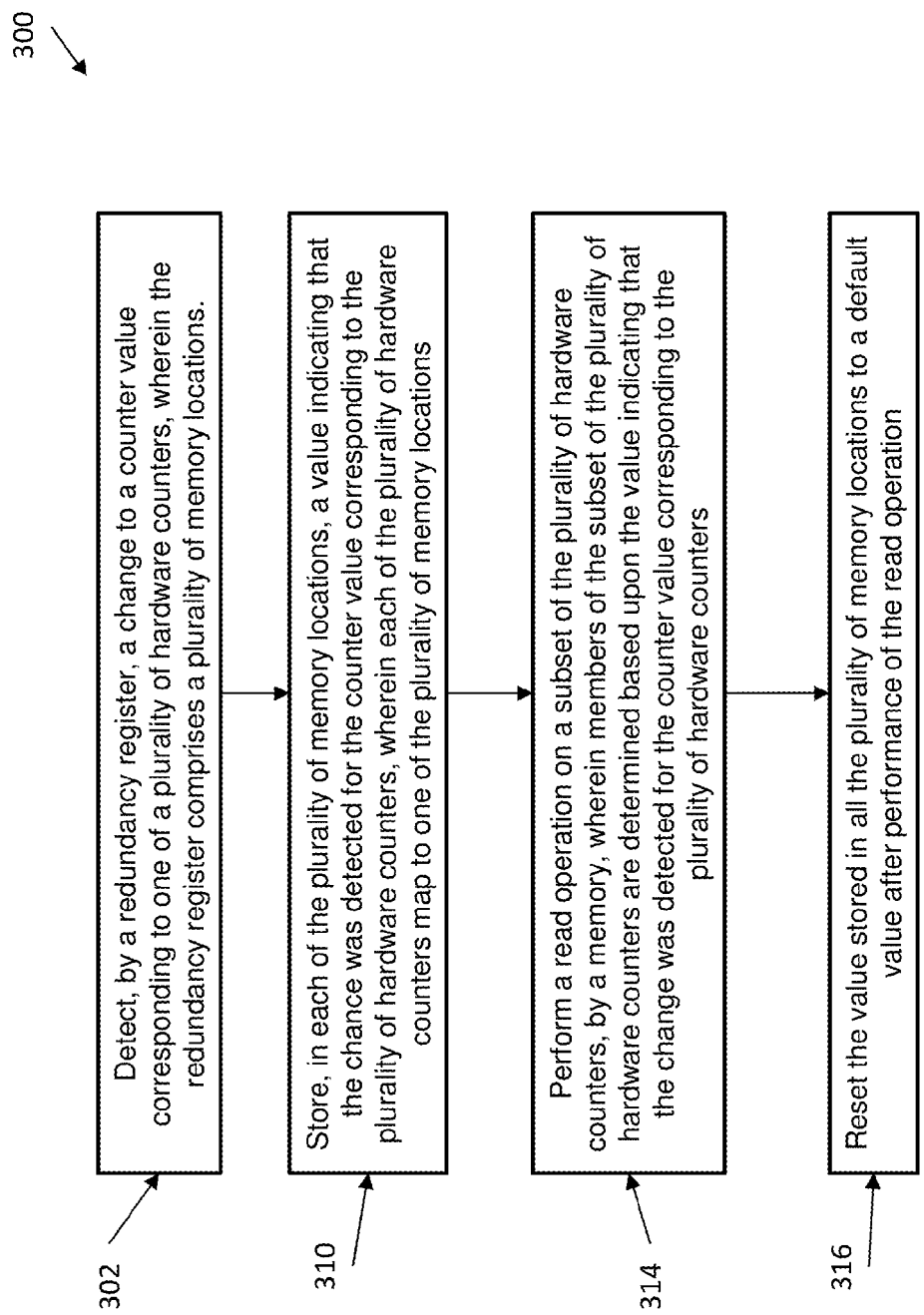
FIG. 3 illustrates a flow diagram of a method for performance monitoring using a redundancy tracking register in accordance with an embodiment.

FIG. 3 is a flow diagram of a method 300 for performance monitoring using a redundancy tracking register according to an embodiment. The method 300 includes detecting, by a redundancy register, a change to a counter value corresponding to one of a plurality of hardware counters, wherein the redundancy register comprises a plurality memory locations, as shown at block 302. Next as shown at block 310, the method 300 includes storing, in each of the plurality of memory locations, a value indicating that the chance was detected for the counter value corresponding to the plurality of hardware counters, wherein each of the plurality of hardware counters map to one of the plurality of memory locations. At block 314, the method 300 includes performing a read operation on a subset of the plurality of hardware counters, by a memory, wherein members of the subset of the plurality of hardware counters are determined based upon the value indicating that the change was detected for the counter value corresponding to the plurality of hardware counters. Next, as shown at block 316, the method 300 resets the value stored in all the plurality of memory locations to a default value after performance of the read operation.

Figure 4:
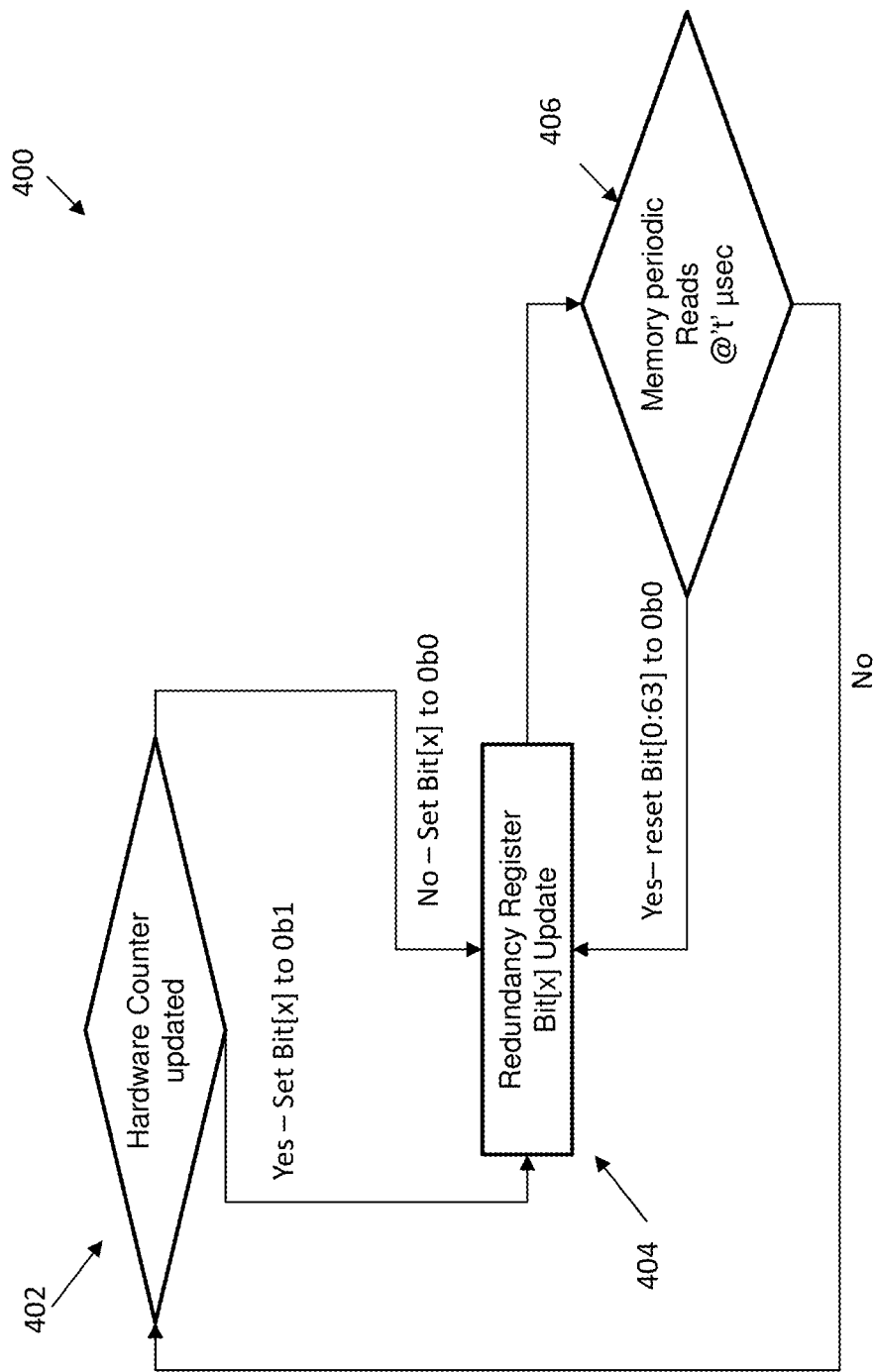
FIG. 4 illustrates a block diagram for performance monitoring using a redundancy tracking register in accordance with an embodiment.

FIG. 4 is a flow diagram of a method 400 for performance monitoring using a redundancy tracking register according to an exemplary embodiment. The method 400 includes determining if a hardware counter is updated, as shown at decision block 402. Depending on whether the hardware counter is updated, the redundancy register bit[x] is updated as shown in block 404. If the hardware counter has been updated, the redundancy register bit[x] is set at value '1' in the register. If the hardware counter has not been updated, the redundancy register bit[x] is set to value '0' in the register. Later, in block 406, a memory will periodically read the redundancy register at a time of 't' µsec. When a memory read occurs, the redundancy register is reset to a value of '0' for all register memory locations. If there is not a memory read, i.e. the operation is less than the 't' µsec, then the method 400 will check to see if the hardware counter is updated as shown in block 402.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performance monitoring, the method comprising:
    detecting, by a redundancy register, a change to a counter value corresponding to one of a plurality of hardware counters, wherein the redundancy register comprises a plurality of memory locations;
    storing, in each of the plurality of memory locations, a value indicating that the change was detected for the counter value corresponding to the plurality of hardware counters, wherein each of the plurality of hardware counters correspond to one of the plurality of memory locations;
    performing a read operation on a subset of the plurality of hardware counters, by a memory, wherein members of the subset of the plurality of hardware counters are determined based upon the value indicating that the change was detected for the counter value corresponding to the plurality of hardware counters; and
    resetting the value stored in all the plurality of memory locations to a default value after performance of the read operation.

2. The method according to claim 1, wherein the value representing the change to the counter value is set to a 1 when the change to the counter value corresponding to a plurality of hardware counters is detected.

3. The method according to claim 1, further comprising storing a copy of the redundancy register in the memory after performing the read operation.

4. The method according to claim 1, wherein the read operation is performed on a periodic basis.

5. The method according to claim 4, wherein the periodic basis is set by a user.

6. The method according to claim 1, wherein the default value is zero.

7. The method according to claim 1, further comprising:
    initializing the redundancy register to the default value prior to detecting the change to the counter value corresponding to one of the plurality of hardware counters.

8. A system for performance monitoring, the system comprising:
    a processor configured to:
        detect, by a redundancy register, a change to a counter value corresponding to one of a plurality of hardware counters, wherein the redundancy register comprises a plurality of memory locations;
        store, in each of the plurality of memory locations, a value indicating that the change was detected for the counter value corresponding to the plurality of hardware counters, wherein each of the plurality of hardware counters correspond to one of the plurality of memory locations;
        perform a read operation on a subset of the plurality of hardware counters, by a memory, wherein members of the subset of the plurality of hardware counters are determined based upon the value indicating that the change was detected for the counter value corresponding to the plurality of hardware counters; and
        reset the value stored in all the plurality of memory locations to a default value after performance of the read operation.

9. The system according to claim 8, wherein the value representing the change to the counter value is set to a 1 when the change to the counter value corresponding to a plurality of hardware counters is detected.

10. The system according to claim 8, wherein the processor is further configured to store a copy of the redundancy register in the memory after performing the read operation.

11. The system according to claim 8, wherein the read operation is performed on a periodic basis.

12. The system according to claim 11, wherein the periodic basis is set by a user.

13. The system according to claim 8, wherein the default value is zero.

14. The system according to claim 8, wherein the processor is further configured to:
    initialize the redundancy register to the default value prior to detecting the change to the counter value corresponding to one of the plurality of hardware counters.

15. A computer program product for performance monitoring, the computer program product comprising:
    a tangible storage medium readable by a processing circuit and storing instructions for execution by the processing circuit for performing a method comprising:

detecting, by a redundancy register, a change to a counter value corresponding to one of a plurality of hardware counters, wherein the redundancy register comprises a plurality of memory locations;

storing, in each of the plurality of memory locations, a value indicating that the change was detected for the counter value corresponding to the plurality of hardware counters, wherein each of the plurality of hardware counters correspond to one of the plurality of memory locations;

performing a read operation on a subset of the plurality of hardware counters, by a memory, wherein members of the subset of the plurality of hardware counters are determined based upon the value indicating that the change was detected for the counter value corresponding to the plurality of hardware counters; and resetting the value stored in all the plurality of memory locations to a default value after performance of the read operation.

16. The computer program product according to claim 15, wherein the value representing the change to the counter value is set to a 1 when the change to the counter value corresponding to a plurality of hardware counters is detected.

17. The computer program product according to claim 15, further comprising storing a copy of the redundancy register in the memory after performing the read operation.

18. The computer program product according to claim 15, wherein the read operation is performed on a periodic basis.

19. The computer program product according to claim 18, wherein the periodic basis is set by a user.

20. The computer program product according to claim 15, wherein the default value is zero.

* * * * *